US006666626B2

(12) United States Patent
McMahon et al.

(10) Patent No.: US 6,666,626 B2
(45) Date of Patent: Dec. 23, 2003

(54) SYSTEM FOR TRANSPORTING SLIDERS FOR ZIPPER BAGS

(75) Inventors: Michael McMahon, Palatine, IL (US); Stanley Piotrowski, Schiller Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/106,687

(22) Filed: Mar. 25, 2002

(65) Prior Publication Data

US 2003/0180100 A1 Sep. 25, 2003

(51) Int. Cl.[7] ............................................. B65G 53/66
(52) U.S. Cl. ............................. 406/50; 400/25; 400/32; 400/75; 400/176
(58) Field of Search ............................. 406/25, 32, 75, 406/147, 148, 149, 150, 176, 50

(56) References Cited

U.S. PATENT DOCUMENTS 3,172,705 A * 3/1965 Burre ......................... 406/75
4,275,976 A * 6/1981 Sticht ......................... 406/28
6,210,081 B1 * 4/2001 Saho et al. ................. 406/134
6,468,005 B1 * 10/2002 Esper ......................... 406/31

* cited by examiner

Primary Examiner—Joseph A. Dillon
(74) Attorney, Agent, or Firm—Pitney, Hardin, Kipp & Szuch LLP

(57) ABSTRACT

An apparatus (10) for and a method of transporting sliders to the slider insertion area (27) of a slider insertion device (18). A first sensor (30) on a sender track (20) detects a lack of sliders (21) in the sender track. A signal is sent from the first sensor (30) to a controller (24) to actuate a vibratory bowl (14) of sliders (21), and a first solenoid operated plunger (34) thereby releasing the sliders (21) to the sender track (20). Air connections (38) pneumatically push the sliders (21) along the sender track (20) to a second solenoid-operated plunger (44). When a second sensor (46) detects a lack of sliders in the loading rack (26), the second sensor (46) signals the controller (24) to actuate a second solenoid-operated plunger (44) and a solenoid-operated pneumatic valve (48). The second solenoid-operated plunger (44) opens a passage and the pneumatic valve (48) opens to provide an air blast, thereby launching the sliders (21) into the feed tube (22) and onto the slider insertion area (27).

13 Claims, 3 Drawing Sheets

SYSTEM FOR TRANSPORTING SLIDERS FOR ZIPPER BAGS

RELATED APPLICATION

This application is a continuation-in-part of the application filed Mar. 11, 2002, entitled "INSERTION APPARATUS FOR ATTACHING SLIDERS ONTO ZIPPER BAGS AND FILM".

FIELD OF THE INVENTION

The present invention relates to the process of inserting sliders onto slide zippers used on reclosable plastic bags and, more particularly, to an apparatus which pre-positions and feeds a fixed number of sliders to the slider insertion area of a slider insertion device with the fixed numbers of sliders based on the requirements of the slider insertion device.

DESCRIPTION OF THE PRIOR ART

Reclosable bags having slide zippers are generally more desirable to consumers than bags which have traditional interlocking zippers, since such bags are perceived to be easier to open and close than slider-less zippers. As a result, slide zippers for use with plastic bags are numerous and well-known in the reclosable fastener art. Typical slide zippers comprise a plastic zipper having two interlocking profiles and a slider for engaging and disengaging the interlocking profiles of the zipper.

Methods and apparatuses for manufacturing reclosable plastic bags using reclosable zippers with a slider are also well-known in the art. Known slider loaders include the Hugues reference (U.K. Patent No. 2,085,519) and the LaGuerve references (U.S. Pat. Nos. 3,701,191 and 3,701,192) as well as the slider insertion device provided in the application filed Mar. 11, 2002; entitled "INSERTION APPARATUS FOR ATTACHING SLIDERS ONTO ZIPPER BAGS AND FILM". Typically, a loading rack providing a supply of sliders to a slider insertion area is attached as part of the slider loader or slider insertion apparatus. As such, the use of loading racks with slider loaders or other insertion devices is fairly well-developed in the prior art, but nevertheless remains open to improvements contributing to an increased efficiency and cost-effectiveness during the manufacture of reclosable bags.

An improvement to the use of loading racks is to provide a feed tube and sender apparatus in which sliders are pneumatically transported in predetermined amounts from a supply of sliders to the loading rack. By transporting and positioning the sliders in such a manner, the amount of jamming of the sliders during transport to the loading rack is reduced. A reduction in jamming thereby reduces downtime of the slider insertion apparatus or loader as well as the maintenance problems associated with the downtime.

A further improvement is to provide an optional loading rack as part of the feed tube and sender apparatus. The loading rack would pneumatically guide the sliders from the feed tube to an insertion area of a slider insertion apparatus. By pneumatically guiding the sliders, the possible amount of jamming of the sliders in the loading rack is reduced.

SUMMARY OF THE INVENTION

Accordingly, the present invention provides a slider feed apparatus for transporting sliders from a supply of sliders to a slider insertion area of a slider insertion device. The slider feed apparatus generally includes a sender track, a feed tube, an optional loading rack, and a controller. In the slider feeding process, a first sensor on the sender track detects a lack of sliders in the sender track. A signal is sent from the first sensor to a controller. The controller turns on a vibratory bowl and actuates a first solenoid-operated plunger, thereby releasing a quantity of sliders from a supply of sliders in the vibratory bowl to a slider entry port of the sender track.

Once the first sensor detects that the sender track has an adequate quantity of sliders, the controller turns off the vibratory bowl. Once released from the vibratory bowl to the sender track, air connections pneumatically push the sliders along the sender track to a second solenoid-operated plunger.

A second sensor is connected to the loading rack to detect a lack of sliders in the loading rack. Upon detecting a lack of sliders, the second sensor signals the controller. The controller actuates the second solenoid-operated plunger and a solenoid-operated pneumatic valve. Upon actuation, the second solenoid-operated plunger opens a passage in the sender track and the pneumatic valve opens to provide an air blast in the sender track, thereby launching a group of sliders out of the sender track into the feed tube. The first solenoid-operated plunger, in a corollary function, prevents sliders from being pushed back into the vibratory bowl by closing the passage back to the vibratory bowl when the pneumatic valve is actuated to open.

As the group of sliders passes from the sender track to the feed tube and further on to the loading rack, the loading rack is filled or the quantity of sliders required is met. The second sensor detects that the quantity of sliders is sufficient and then signals the controller to actuate the pneumatic valve and the solenoid-operated plungers to a closed position. This process repeats itself as sliders are being used during insertion.

The loading rack guides the sliders from the feed tube to an insertion area of a slider insertion apparatus or loader. The loading rack includes multiple angular air connections for directing air flow that pneumatically move the sliders along the loading rack. In addition to the second sensor, a third sensor is provided as a backup to signal the controller in case spacing occurs between sliders because of rebounding caused during the feeding of the sliders.

BRIEF DESCRIPTION OF THE DRAWINGS

Thus by the present invention its objects and advantages will become readily apparent upon reading the following detailed description taken in conjunction with the accompanying drawings, in which.

DETAILED DESCRIPTION OF THE PREFERRED EMBODIMENT

Figure 1:
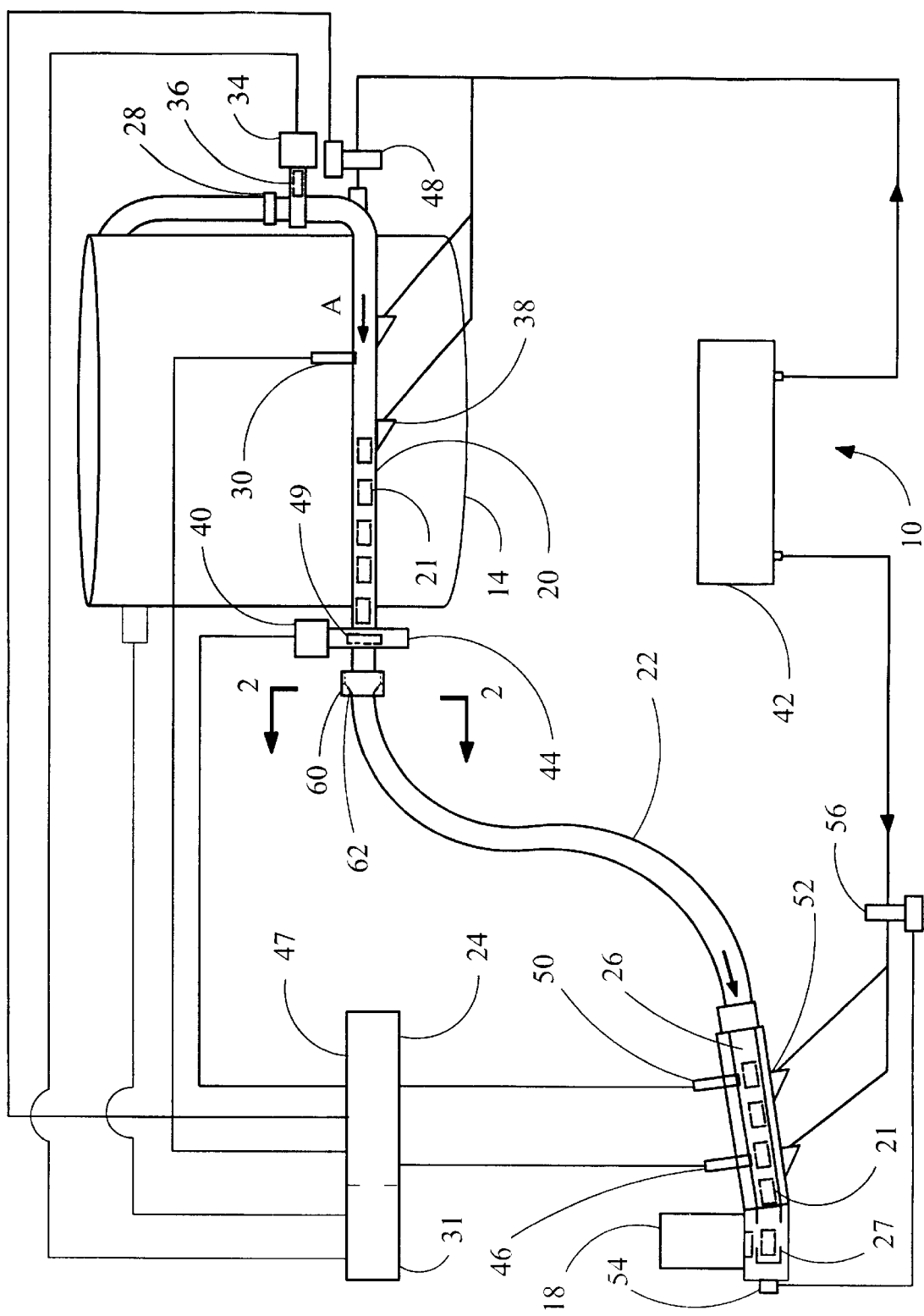
FIG. 1 is an arrangement view of a feed tube and sender apparatus of the present invention with sliders being fed to a loading rack of a slider insertion device.

Referring now to the drawings in detail wherein like numerals indicate like elements throughout the several views, FIG. 1 is an arrangement view depicting the feed tube and sender apparatus 10 of the present invention. The feed tube and sender apparatus 10 will hereinafter be referred to as the apparatus 10.

As shown in the figure, the apparatus 10 provides a conduit for sliders supplied by a vibratory bowl 14 to a slider insertion device 18. The apparatus generally includes an elongated sender track 20, a feed tube 22, a controller 24 and an optional loading rack 26. The loading rack 26 is optional since the apparatus can be attached to existing loading racks of slider insertion devices. The specially shaped feed tube 22 of the apparatus 10 will be further discussed below in relation to FIG. 2.

In the slider feeding process, a first sensor 30 on the sender track 20 detects the amount of, or a lack of, sliders 21 in the sender track. The first sensor 30 signals the controller 24. The controller 24, which may be computer based or an electrical control panel based component, actuates the vibratory bowl 14 to an operating mode. When operated, the vibratory bowl 14 releases a quantity of sliders 21 from a supply of sliders in the vibratory bowl to a slider entry port 28 of the sender track 20. Once the first sensor 30 detects that the sender track 20 has a predetermined amount or an adequate quantity of sliders, the controller 24 actuates the vibratory bowl 14 to a shutdown mode.

Additionally or alternatively, a first controller 31 of the controller 24 actuates a blocking member such as a first solenoid-operated plunger 34. The first solenoid-operated plunger 34 or blocking member allows the movement of the sliders 21 from the vibratory bowl 14 to the sender track 20 during the operating mode of the vibratory bowl. During the shutdown mode of the vibratory bowl 14, a reciprocating piston 36 of the first solenoid-operated plunger 34 prevents the movement of the sliders 21 from the vibratory bowl by blocking passage within the sender track 20. The first solenoid-operated plunger 34, as well as other solenoid-operated equipment described below, may be actuated by means other than a controller, with the actuating means known to those skilled in the art.

The quantity of sliders 21 released to the sender track 20 is pushed along the sender track by directional air connections 38. The air connections 38, which are positioned along the elongated portion of the sender track 20, pneumatically push the sliders to a slider exit port 40 of the sender track 20. The air connections 38 are fluidly supplied by pressurized air from an air register 42 (shown for illustrative purposes) or by any other pressurized air source.

A second blocking member, such as solenoid-operated plunger 44, is positioned at the slider exit port 40. Once the sliders 21 are sent to the slider exit port, they are ready to be launched into the feed tube 22.

Launching of the sliders 21 is based upon the amount of sliders in the loading rack 26; however, other control factors may initiate the launch of the sliders. A second sensor 46 of the apparatus. 10 is connected to the loading rack 26 to detect a lack of sliders 21 in the loading rack or variations in the amount of sliders required in the loading rack. When a lack of sliders 21 or a variation of the required amount of sliders is detected, the second sensor 46 signals the controller 24. A second controller 47 of the controller 24 actuates the second solenoid-operated plunger 44 and a solenoid-operated pneumatic valve 48.

Upon actuation, the reciprocating piston 49 of the second solenoid-plunger 44 opens a passage from the sender track 20 to the feed tube 22. Simultaneously, the pneumatic valve 48 opens to provide an air blast in the sender track upstream of sliders 21. The air blast launches the sliders 21 out of the sender track 20 in direction "A". The first solenoid-operated plunger 34, in a corollary function, prevents the air-launched sliders 21 from being pushed back into the vibratory bowl 14 by closing the passage back to the vibratory bowl when the pneumatic valve is activated.

The launched sliders 21 pass from the sender track 20 to the feed tube 22. As will be discussed below, the feed tube 22 is uniquely molded to ensure efficient passage of the sliders 21 without jamming during operation. After passage through the feed tube 22, the loading rack 26 is supplied with a sufficient quantity of sliders 21. Once a sufficient quantity of sliders 21 is detected in the loading rack 26, the second sensor 46 signals the controller 24 to actuate the pneumatic valve 48 and the solenoid-operated plunger 44 to a closed position. This process repeats itself as the sliders 21 are being used during insertion onto a zipper for a reclosable bag. A third sensor 50 is provided as a backup to signal the controller 24 when more sliders 21 are needed in the loading rack 26.

The optional loading rack, shown as the loading rack 26 in FIG. 1, further assists the transport of the sliders 21 to a slider insertion area 27 of the slider insertion device 18. Similar to the sender track 20, the loading rack 26 is a track that maintains the orientation of the sliders 21. Also similar to the sender track 20, the quantity of sliders 21 that is released to the loading rack 26 is pushed on the loading rack by directional air connections 52. The air connections 52 are positioned along the elongated portion of the loading rack 26 to pneumatically move the sliders to the slider insertion area 27 of the slider insertion device 18. The air connections 38 are fluidly supplied by pressurized air from the air register 42 or by any other pressurized air source.

A fourth sensor 54 is provided to detect the presence of a slider 21 in the slider insertion area 27. If the fourth sensor 54 does not detect a slider in the slider insertion area 27, the fourth sensor signals the solenoid-operated pneumatic valve 56 to release air into the loading rack 26, thereby moving the slider to the insertion area.

As shown in the figure, the loading rack 26 may slant away from the loading rack. A slight slant assists the movement of the sliders 21 in the rack, especially if the source of pressurized air is unavailable. The slant of the loading rack is preferably fifteen degrees off an axis perpendicular to the direction of slider insertion. However, other slant angles, as well as a curved loading rack, may be used.

As stated previously, the feed tube 22 is uniquely molded to ensure efficient passage of the sliders 21 without the sliders jamming within the feed tube 22 during operation. The feed tube 22 is preferably molded from a resilient material such as polyurethane; however, other materials for molding would be known to those skilled in the art. A resilient material prevents the feed tube 22 from axially twisting or kinking, thereby allowing the feed tube to be formed as a curved path.

Figure 2:
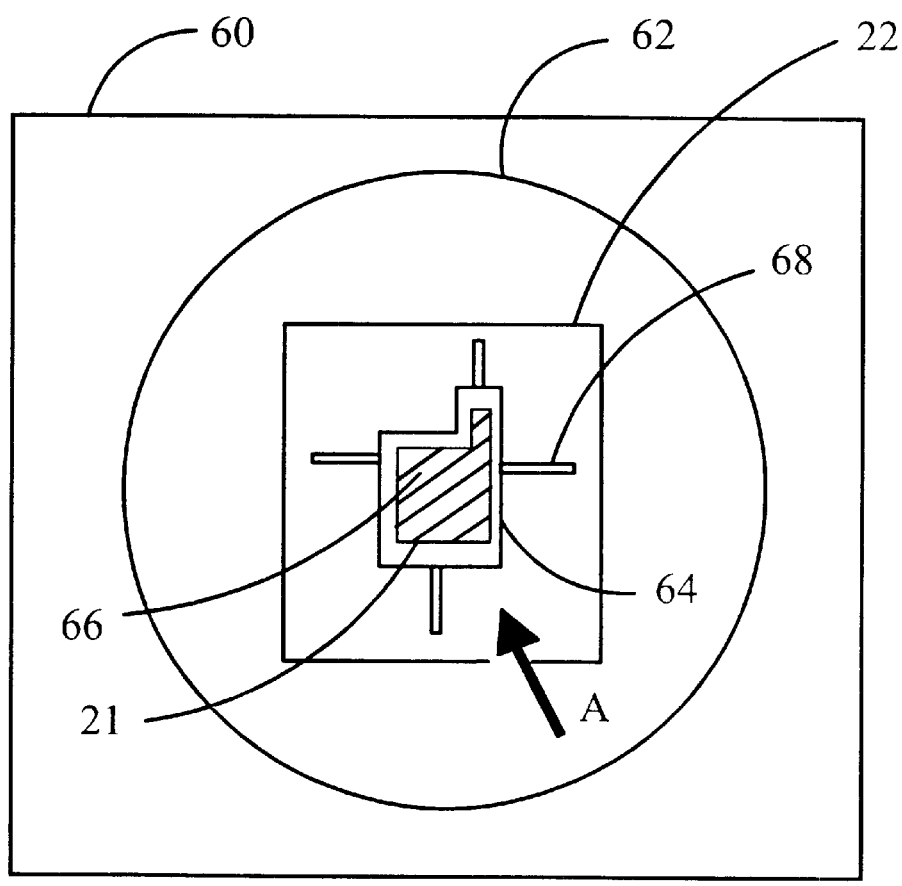
FIG. 2 is a cross-sectional view of the feed tube at the attachment piece of the sender track of the present invention.

In the cross-sectional view of FIG. 2, the feed tube 22 is press-fit and fastened to an attachment piece 60 located at the slider exit port 40 of the sender track 20. The feed tube 22 is fastened within the attachment to form a bellmouth 62. The expanded opening of the bellmouth 62 allows the sliders 21 launched from the sender track 20 to position within an interior passage 64. The interior passage 64 is sized to efficiently transport the sliders 21 from the slider exit port to a loading rack by being shaped to the sliders 21 used for the particular slider insertion device 18.

During the launching of the sliders in direction "A", the pressurized air from the sender track 20 acts against a cross section 66 of each slider 21 as it enters the bellmouth 62. Since the interior passage 64 is slightly larger than the cross section 66 but is shaped the same, the effectiveness of the pressurized air is enhanced and the positioning of the slider 21 is maintained. Relief passages 68 encompass the interior passage 64 to handle over-pressurization of the feed tube 22 without affecting the movement of the slider 21.

Figure 3:
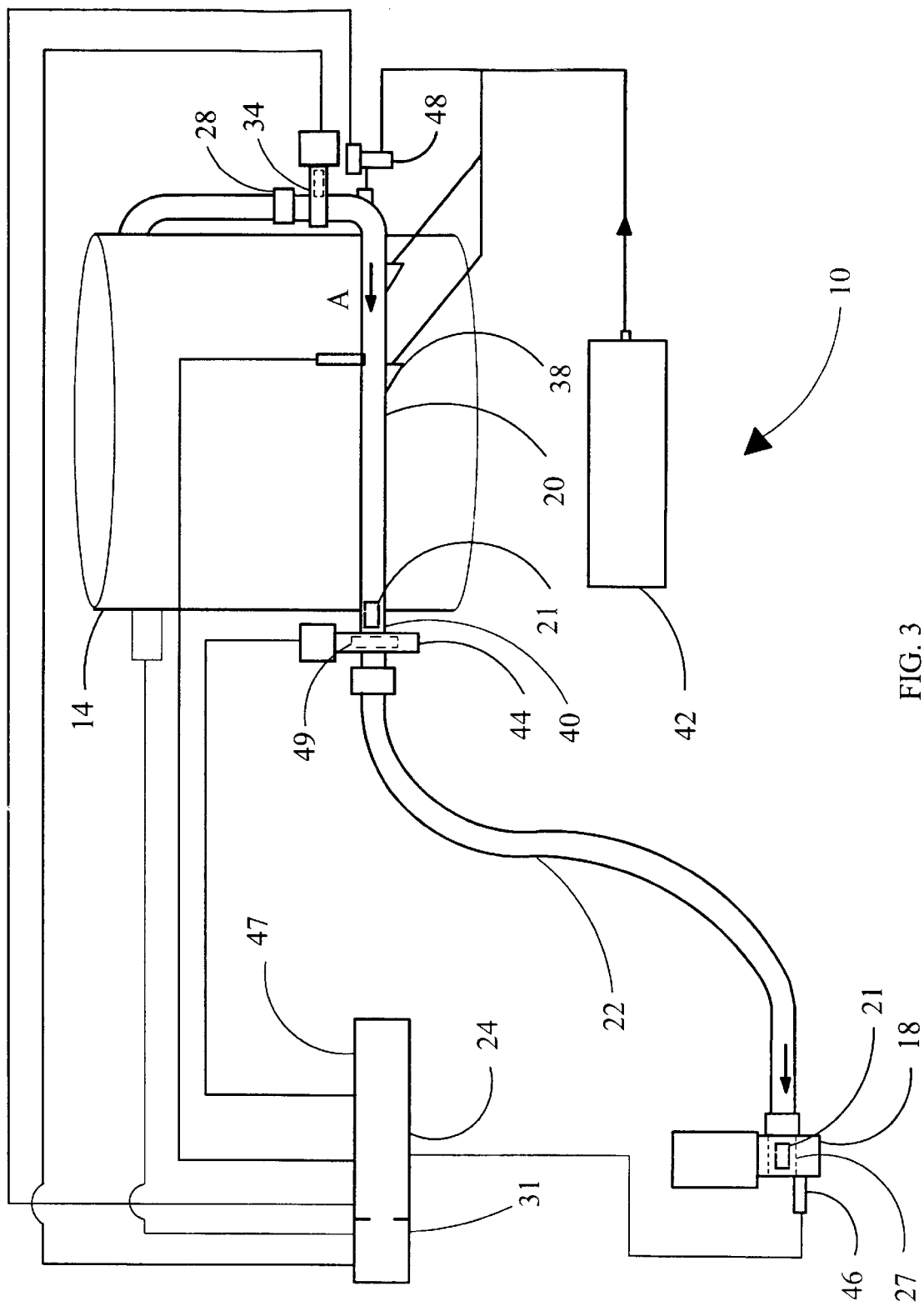
FIG. 3 is an arrangement view of the feed tube and sender apparatus with sliders being fed directly to an insertion area of a slider insertion device.

In some circumstances, such as a space consideration, the loading rack 26 may not be used with the slider insertion device 18. In FIG. 3, the feed tube 22 transports a single slider 21 directly to the slider insertion area 27. Instead of detecting the required quantity of sliders 21 in the loading rack 26, the second sensor 46 detects the presence of a slider 21 within the slider insertion area 27. If the slider 21 is not present, the second sensor 46 signals the controller 24. The second controller 47 of the controller 24 actuates the second solenoid-operated plunger 44 and the solenoid-operated pneumatic valve 48.

Upon actuation, a reciprocating piston 49 of the second solenoid-plunger 44 opens a passage from the sender track 20 to the feed tube 22. Simultaneously, the pneumatic valve 48 opens to provide an air blast in the sender tack upstream of the slider 21. The air blast launches the slider 21 out of the sender track 20 in direction "A". The first solenoid-operated plunger 34 in a single slider feed function may be controlled to allow one slider at a time from the vibratory bowl 14 to the sender track 20.

Similar to the multi-slider feed, the launched slider 21 passes from the sender track 20 to the feed tube 22. After passage through the feed tube 22, the slider insertion device 18 is supplied with the slider 21, ready for insertion. Once the slider 21 is detected in the slider insertion area 27, the second sensor 46 signals the controller 24 to actuate the pneumatic valve 48 and the solenoid-operated plunger 44 to a closed position. This process repeats itself as the sliders 21 are being used during insertion onto a zipper for a reclosable bag.

The foregoing description of the preferred embodiments of the invention has been presented for purposes of illustration and description. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

We claim:

1. An apparatus for feeding a simultaneous plurality of sliders from a zipper supply to a slider insertion area, said apparatus comprising:
    a source of sliders;
    an elongated sender track having a slider entry port and a slider exit port;
    a first controller including a blocking member interposed between the source of the sliders and the slider entry port, said first controller being responsive to the sliders on said sender track to control a flow of a simultaneous plurality of sliders from said source of sliders to said slider entry port;
    a feed tube extending from said slider exit port toward said slider insertion area; and
    a source of pressurized air having an outlet directing said air to urge said sliders along said sender track through said feed tube.

2. The apparatus in accordance with claim 1 further comprising a second controller including a blocking member interposed between the slider exit port and said slider insertion area, said second controller being responsive to the sliders at said slider insertion area to control a flow of sliders from said slider exit port end to said slider insertion area.

3. The apparatus in accordance with claim 1 wherein said sender track is fluidly attached to said source of pressurized air through at least one connection, said connection positioned along an elongated portion of said sender track.

4. The apparatus in accordance with claim 1 wherein said first controller includes a sensor for determining the number of sliders on said sender track.

5. The apparatus in accordance with claim 2 wherein said second controller includes a first sensor for determining the number of sliders in said slider insertion area.

6. The apparatus in accordance with claim 5 wherein said feed tube further comprises an interior passage formed to the shape of said sliders with the cross-section of said interior passage being larger than the cross-section of said sliders.

7. The apparatus in accordance with claim 6 wherein said feed tube further comprises an entry port with a bellmouth wherein a larger diameter cross-section of the bellmouth attaches to the slider exit port of the sender track to direct the sliders along an interior curvature of the bellmouth to the interior passage of the feed tube.

8. The apparatus in accordance with claim 7 wherein said feed tube further comprises over-pressurization relief passages encompassing the interior passage of the feed tube.

9. The apparatus in accordance with claim 5 wherein said slider insertion area is on a slider loading rack wherein the second controller includes a second sensor for determining the number of sliders on said loading rack.

10. An apparatus for feeding sliders from a zipper supply to a slider insertion area, said apparatus comprising:
    a source of sliders;
    an elongated sender track having a slider entry port and a slider exit port;
    a first controller including a blocking member interposed between the source of the sliders and the slider entry port, said first controller being responsive to the sliders on said sender track to control a flow of sliders from said source of sliders to said slider entry port;
    a feed tube extending from said slider exit port toward said slider insertion area; and
    a source of pressurized air having an outlet directing said air to urge said sliders along said sender track through said feed tube;
    a second controller including a blocking member interposed between the slider exit port and said slider insertion area, said second controller being responsive to the sliders at said slider insertion area to control a flow of sliders from said slider exit port end to said slider insertion area;
    wherein said second controller includes a first sensor for determining the number of sliders in said slider insertion area;
    wherein said slider insertion area is on a slider loading rack wherein the second controller includes a second sensor for determining the number of sliders on the loading rack;
    wherein said slider loading rack is fluidly attached to said source of pressurized air through at least one connection positioned along an elongated portion of said slider loading rack.

11. The apparatus in accordance with claim 10 wherein a slider supply portion of said slider loading rack angles away from said slider insertion area.

12. The apparatus in accordance with claim 10 wherein a slider supply portion of said slider loading rack curves away from said slider insertion area.

13. The apparatus in accordance with claim 1 wherein said source of sliders is contained in a vibratory bowl and said first controller further includes means for controlling the actuation of said vibratory bowl.

* * * * *